V. A. FAGERSTROM.
RAPIDLY ACTING VISE.
APPLICATION FILED JULY 13, 1918.
1,295,019.
Patented Feb. 18, 1919.
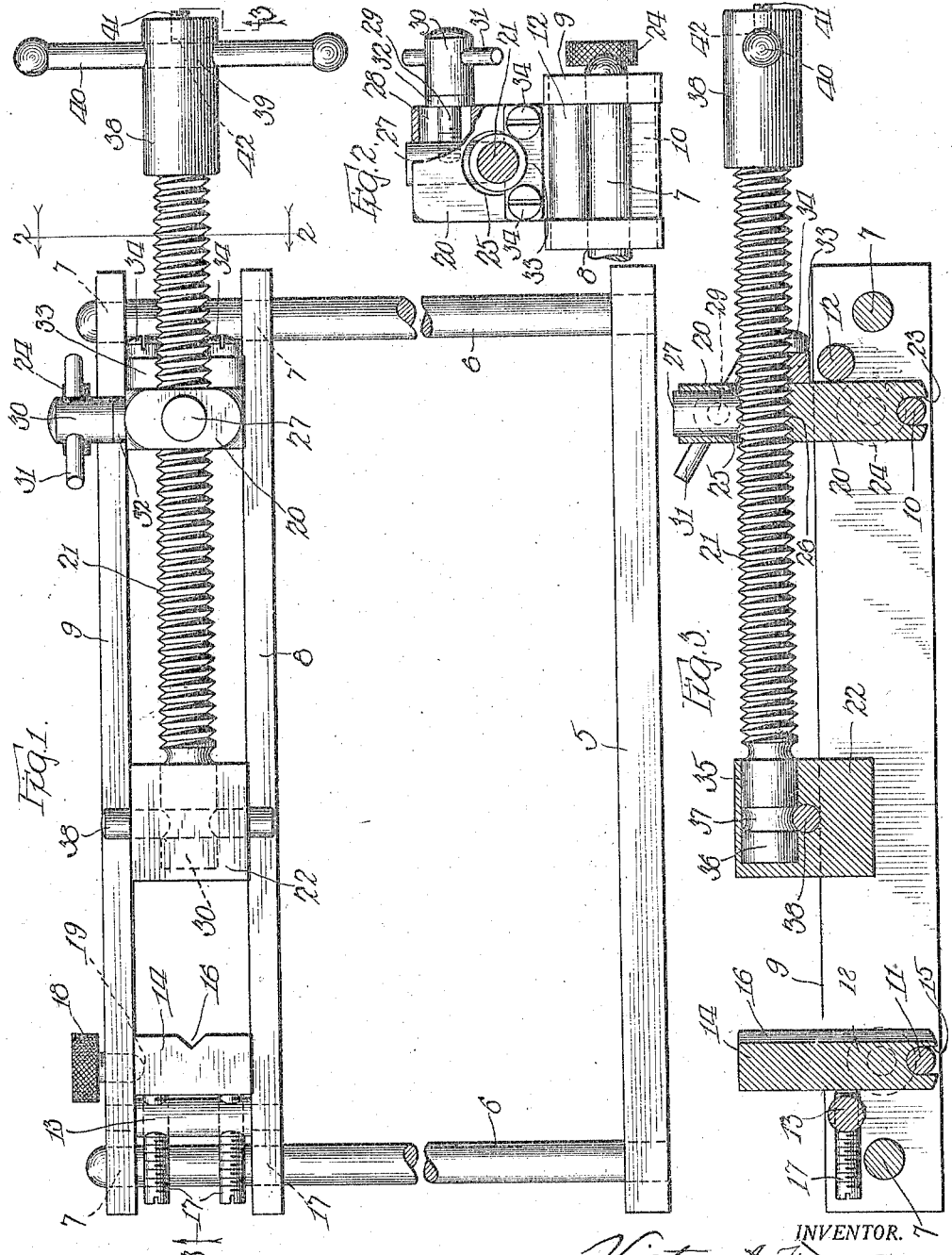
INVENTOR.
Victor A. Fagerstrom,
BY Chas. A. Tillman
ATTORNEYS.

UNITED STATES PATENT OFFICE.

VICTOR A. FAGERSTROM, OF ROCKFORD, ILLINOIS.

RAPIDLY-ACTING VISE.

1,295,019.

Specification of Letters Patent.

Patented Feb. 18, 1919.

Application filed July 13, 1918. Serial No. 244,690.

*To all whom it may concern:*

Be it known that I, VICTOR A. FAGERSTROM, a citizen of the United States, residing at Rockford, in the county of Winnebago and State of Illinois, have invented certain new and useful Improvements in Rapidly-Acting Vises, of which the following is a specification.

This invention relates to improvements in a vise wherein parallel bars or members are employed to form a frame for the clamping jaws and guiding block for the screw which actuates said jaws, and it consists in certain peculiarities of the construction, novel arrangement and operation of the various parts thereof as will be hereinafter more fully set forth and specifically claimed.

The principal object of the invention is to provide a device of the above named general character, which shall be simple and inexpensive in construction, strong, durable and efficient in operation, with its parts so combined, arranged, and operating that the clamping jaws as well as the guiding block for the actuating screw therefor may be readily removed from the parallel bars or frame to permit the latter to be used for other purposes. The invention will be found to be generally useful on drill presses, for surface grinding, on machine tables, and the like. A further and important object of the invention is to so construct its parts that the clamping jaws thereof may be more readily or quickly adjusted with respect to one another than has heretofore generally been accomplished and in such a way that articles of various shapes may be properly and firmly held by said jaws.

Various other objects and advantages of the invention will be disclosed in the subjoined description and explanation.

In the accompanying drawing which serves to illustrate an embodiment of the invention—

Figure 1 is a plan view of the device showing the connecting rods for an auxiliary parallel bar, shortened for the convenience of illustration and illustrating the clamping jaws separated but one of them ready to be moved in either direction.

Fig. 2 is a cross sectional view taken on line 2—2 of Fig. 1 looking in the direction indicated by the arrows, and Fig. 3 is a longitudinal sectional view taken on line 3—3 of Fig. 1 looking in the direction indicated by the arrows.

Like numerals of reference refer to corresponding parts throughout the different views of the drawing.

In Fig. 1 I have shown the device as it appears when constructed for operating on large objects or articles and as including an auxiliary parallel bar 5 connected to the main frame of the device by means of rods 6 detachably located near their ends in openings 7 in the parallel bars or members 8 and 9 which comprise parts of the main frame. However, this auxiliary bar 5 and the connecting rods 6 may and usually will be omitted, except where the work to be operated on by the vise is of a long and large character. The bar 5 is by preference slidably mounted on the rod 6 so that it can be slid toward or from the bar 8 of the main frame to suit the dimensions of the article being worked on.

Assuming that the auxiliary bar 5 and the connecting rods 6 therefor are not required, or have been dispensed with, the main frame of the device consists of the two spaced apart parallel bars or members 8 and 9 which are held in spaced relation by means of transverse bolts or rods 10, 11, 12 and 13 which as shown in the drawing are located between and near the ends of the members 8 and 9 of the frame. The connections may be riveted or otherwise suitably fixed in openings therefor in said bars so as to hold the latter in true parallelism with one another. By reference to Fig. 3 of the drawing, it will be seen that the bolts or rods 10 and 11 are located inwardly and below the rods 12 and 13 respectively, and are by preference somewhat smaller in diameter than the rods 12 and 13 for the purpose to be presently explained. Vertically mounted on the rod 11 between the members 8 and 9 is a clamping jaw 14 which has in its lower end a transverse slot 15 to receive the rod 11 on which it is mounted. The jaw 14 may have in its inner face a vertical groove 16 of angular or other shape to receive and engage a similarly shaped portion of the object or article in contact therewith in the operation of the vise. The rod 13 is provided with a pair of adjusting screws 17 to be used for adjusting the inclination of the jaw 14, should such inclination be necessary to cause said jaw to properly contact with the article having a beveled surface or portion adjacent to said jaw. In order to fix the jaw 14 in any position to which it may be moved, one of the bars of the main frame, in the present instance, the bar 9 has seated therein a thumb or set screw 18 the inner end of which engages an opening 19 in the side of the jaw adjacent to said bar, or if desired said opening may be omitted and the inner end of the screw 18 allowed to contact with the adjacent side of the jaw.

Located near the other ends of the bars 8 and 9 and between the same is a guiding block 20 for the screw shaft 21 which advances and retracts the sliding jaw 22. The block 20 is provided at its lower end with a transverse slot 23 to receive the rod 10 on which it is mounted and may be fixed in any suitable position by means of a set or thumb screw 24 seated in one of the rails or bars 8 and 9 of the main frame so that its inner end will engage the adjacent side of said block. As shown, this block extends considerably above the parallel bars 8 and 9 and is provided with an opening 25 which is considerably larger than the screw shaft 21, see Figs. 2 and 3 of the drawing. The lower portion of the opening 25 may be provided with screw threads 26 of the same pitch as the threads of the shaft 21 from which threads said shaft can be disengaged by moving it upwardly, thus allowing the shaft to be quickly and readily moved longitudinally with respect to the main frame so as to adjust the slidable jaw 22 with respect to the jaw 14 almost instantly. Loosely and vertically mounted in a suitable opening in the upper portion of the block 20 is a plug 27 which has its lower end provided with screw threads to engage the threads of the shaft 21 when in engaging position therewith. One side of the block 20 is provided near its upper end with a vertical slot 28 through which is extended a thumb or set screw 29 which engages at its inner end the plug 27 as is clearly shown in Fig. 2 of the drawing. The screw 29 has on its outer portion a knob 30 provided with a handle 31 and located between said knob and the adjacent side of the block 20 is a collar 32 which is swiveled on the screw bolt 29 so that when the knob 30 is turned it will rest against the sides of the slot 28 and thus hold the plug 27 in the desired position. By this arrangement it is obvious that the block 20 can be raised out of engagement with the shaft 21 by moving the screw 29 upwardly in the slot 28 and then tightening said screw. When in such position it is evident that the shaft 21 can be slightly lifted and freely moved back and forth. To give further stability to the bearing of the shaft 21 in the block 20, said block may have transversely mounted thereon a member 33 having screw threads in its upper portion and adjustably held for vertical movement by means of screws 34 engaging said block.

The clamping jaw 22 has in its upper portion an opening 35 which extends longitudinally with respect to the main frame and is for the reception of a head 36 on the front end of the shaft or screw 21 which head is provided with an annular groove 37 to receive a portion of a pin 38 extended transversely through the jaw 22 with its ends projected therefrom so as to rest on the upper surfaces of the parallel bars 8 and 9 of the main frame. On the opposite end of the screw or shaft 21 is mounted a sleeve 38 which has near its outer end a transverse opening 39 through which is extended a handle 40 which can be held in place by means of a set screw 41 seated in the outer end of said sleeve. In order to hold the handle 40 in the desired position yet so as to permit it to be moved longitudinally a piece of felt 42 or similar material may be located between the inner end of the set screw 41 and said handle.

From the foregoing and by reference to the drawing it will be understood and clearly seen that the front or inner end of the screw or shaft 21 is swiveled in the slidable jaw 22 and that when it is desired to move said jaw toward or from the jaw 14, this can be done in the ordinary slow manner by turning the screw 21 in the proper direction, but by my improvements, it is obvious that by raising the plug 27 out of engagement with the screws 21 and then by lifting the said screw slightly, it will be disengaged from the block 20 and can be moved in either direction freely and without loss of time, thus enabling the jaw 22 to be instantly adjusted to the article or object to be clamped between it and the jaw 14 which is adjustable as above explained. In some instances I may employ a block 20 having an ordinary screw threaded opening for the screw 21, in which event it is obvious that the plug 27 will not be required.

Having thus fully described my invention, what I claim as new and desire to secure by Letters Patent is—

1. In a device of the class described, the combination with a frame having spaced parallel side members, of a jaw detachably and adjustably mounted for tilting movement between said members near one of their ends, means on one of said side members to fix said jaw in its adjusted position and means mounted between said side members to restrict the movement of said jaw in one direction and to regulate its inclination, a guide block detachably mounted between said side members near their other ends and having an opening therein with a portion thereof screw-threaded, means extended cross-wise of said members to prevent movement of said block in one direction, a plug adjustably located in said block and extended into said opening and having its inner end screw-threaded, means mounted on one of said side members to fix said block, a screw located in the opening of said block and extended longitudinally with the frame between the side members thereof, a clamping jaw swiveled on the front end of the said screw and extended between the side members of the frame, and lateral projections on the last-named jaw resting on the upper surface of said side members.

2. In a device of the class described, the combination with a frame having spaced parallel side members, of a jaw detachably and adjustably mounted for tilting movement between said members near one of their ends, means between said side members to adjust the inclination of said jaw and to restrict its movement in one direction, a guide block detachably mounted between said side members near their other ends and having an opening therein with a portion thereof screw-threaded, a plug adjustably located in said block and extended into said opening and having its inner end screw threaded, a member adjustably mounted on one of the faces of said block below the opening therein for vertical movement and having its upper portion screw-threaded, a screw located in the opening of said block and extended longitudinally with the frame between the side members thereof and having an annular groove near its front end, a clamping jaw slidably mounted between the said side members of the frame and having an opening therein to receive the front end of said screw, and a pin extended transversely through the last named jaw below the opening therein to engage the groove in said screw and to rest on the upper surface of the said members of the frame.

VICTOR A. FAGERSTROM.

Witnesses:
J. A. BOWMAN,
FRED CAMPBELL.

Copies of this patent may be obtained for five cents each, by addressing the "Commissioner of Patents, Washington, D. C."